United States Patent
Hsu (10) Patent No.: US 11,177,522 B2
(45) Date of Patent: Nov. 16, 2021

(54) BATTERY PACK

(71) Applicant: MOBILETRON ELECTRONICS CO., LTD., Taichung (TW)

(72) Inventor: Ming-Hung Hsu, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 248 days.

(21) Appl. No.: 15/926,580

(22) Filed: Mar. 20, 2018

(65) Prior Publication Data
US 2019/0207176 A1    Jul. 4, 2019

(30) Foreign Application Priority Data
Jan. 2, 2018    (TW) ................... 107100094

(51) Int. Cl.
| H01M 50/20 | (2021.01) |
| H01M 10/42 | (2006.01) |
| H01M 10/48 | (2006.01) |
| H01M 50/502 | (2021.01) |
| H01M 50/284 | (2021.01) |

(52) U.S. Cl.
CPC ......... *H01M 50/20* (2021.01); *H01M 10/425* (2013.01); *H01M 10/4257* (2013.01); *H01M 10/482* (2013.01); *H01M 50/284* (2021.01); *H01M 50/502* (2021.01); *H01M 2010/4271* (2013.01); *H01M 2220/20* (2013.01)

(58) Field of Classification Search
CPC .......................................... H01M 50/284–287
See application file for complete search history.

(56) References Cited

U.S. PATENT DOCUMENTS

| 2006/0246781 A1* | 11/2006 | Yoon ...................... H01M 2/202 |
| | | 439/627 |
| 2011/0206948 A1* | 8/2011 | Asai .................... H01M 10/652 |
| | | 429/7 |
| 2012/0161677 A1* | 6/2012 | Kunimitsu .......... H01M 2/1077 |
| | | 318/139 |

(Continued)

FOREIGN PATENT DOCUMENTS

| CN | 102484385 A | 5/2012 |
| CN | 104064699 A | 9/2014 |

(Continued)

OTHER PUBLICATIONS

Machine translation of JP 2015-060690 A (Year: 2015).*

(Continued)

*Primary Examiner* — Robert S Carrico
(74) *Attorney, Agent, or Firm* — R. Lynette Wylie; Apex Juris, pllc.

(57) ABSTRACT

A battery pack includes a fixing frame, at least one battery assembly, and a monitoring device for monitoring the at least one battery assembly, wherein the battery assembly is disposed on the fixing frame. The battery assembly includes a plurality of battery modules which are arranged along a predetermined axial direction. The monitoring device is disposed on the fixing frame, and is located on a side of the battery assembly in the predetermined axial direction. A minor axis of the monitoring device is located in the predetermined axial direction. In this way, the overall length of the battery pack can be reduced.

5 Claims, 6 Drawing Sheets

(56) References Cited

U.S. PATENT DOCUMENTS

| | | | | |
|---|---|---|---|---|
| 2015/0037650 | A1* | 2/2015 | Lee | H01M 50/502 |
| | | | | 429/121 |
| 2015/0343919 | A1* | 12/2015 | Sakata | B60L 50/66 |
| | | | | 320/109 |
| 2018/0076425 | A1* | 3/2018 | Takahashi | H01M 50/20 |
| 2018/0159096 | A1* | 6/2018 | Kim | H01M 10/0525 |

FOREIGN PATENT DOCUMENTS

| | | | |
|---|---|---|---|
| CN | 204464357 U | | 7/2015 |
| CN | 206546836 U | | 10/2017 |
| DE | 102014215033 A1 | | 2/2016 |
| JP | 2015060690 A | * | 3/2015 |
| JP | 6141732 B2 | | 6/2017 |
| TW | I295863 B | | 4/2008 |
| WO | 2014203822 A1 | | 12/2014 |

OTHER PUBLICATIONS

Examination Report for TW107100094, dated Jul. 4, 2018, Total of 3 pages.
Search Report for TW107100094, dated Jul. 4, 2018, Total of 1 page.
English Abstract for JP6141732, Total of 1 page.
English Abstract for TWI295863, Total of 1 page.
Chinese search report for CN201810029612.1, dated Apr. 2, 2021, Total of 2 pages.
English abstract for CN102484385, Total of 1 page.
English abstract for CN206546836, Total of 1 page.
English abstract for CN104064699, Total of 1 page.
English abstract for DE102014215033, Total of 1 page.
English abstract for WO2014203822, Total of 1 page.
English abstract for CN204464357, Total of 1 page.

* cited by examiner

BATTERY PACK

BACKGROUND OF THE INVENTION

1. Technical Field

The present invention relates generally to a battery, and more particularly to a battery pack.

2. Description of Related Art

With the advancement in technology, the demand of electric energy is increased. As for the demand of large electric power, AC power or a battery pack formed by connecting a plurality of battery modules in series can be used as a power source. The advantage of using the battery pack as a power source is that the power source is movable, which is not limited to be used at a fixed location.

In order to fix a plurality of battery modules, a receiving space for placing the battery modules is defined by a battery holder. In addition, in order to understand the state of the battery modules, a battery monitoring device is disposed for monitoring the voltage and temperature of the battery modules. The battery modules, the battery holder, and the battery monitoring device constitute a battery pack, which could be moved easily.

The conventional battery pack is mostly applied to electric vehicles such as vehicles, ships, etc. A plurality of battery packs are disposed on the electric vehicles to form a power supply for the electric vehicle.

However, the space of the electric vehicle is limited. Therefore, there is a need for the manufacturers to develop a battery pack having a smaller volume.

BRIEF SUMMARY OF THE INVENTION

In view of the above, the primary objective of the present invention is to provide a battery pack, which could reduce an overall length of the battery pack.

The present invention provides a battery pack, which includes a fixing frame, at least one battery assembly, and a monitoring device for monitoring the at least one battery assembly, wherein the at least one battery assembly is disposed on the fixing frame. The at least one battery assembly comprises a plurality of battery modules which are arranged along a predetermined axial direction. The monitoring device is electrically connected to the at least one battery assembly and is disposed on the fixing frame, and is located on a side of the at least one battery assembly in the predetermined axial direction. The monitoring device has a first length in the predetermined axial direction and a second length in an axial direction which is perpendicular to the predetermined axial direction, wherein the first length is smaller than the second length.

By disposing the monitoring device in the first axial direction and on a side of the battery assembly, and by making the length of the monitoring device in the first axial direction be smaller than the lengths in others axial direction, the overall length of the battery pack could be reduced.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A battery pack of an embodiment according to the present invention is illustrated in FIG. 1 to FIG. 6, wherein the battery pack includes a case 10, at least one battery assembly 20, a fixing frame 30, and a monitoring device 40 for monitoring the at least one battery assembly 20. In order to illustrate easily, three axial directions, which are perpendicular to one another, are defined, wherein the three axial directions include a first axial direction X, a second axial direction Y, and a third axial direction Z.

The case 10 includes a first body 12 and a second body 14, wherein the first body 12 is engaged with the second body 14 along the second axial direction Y. A length of the first body 12 in the second axial direction Y is greater than a length of the second body 14 in the second axial direction Y. A space 10a is formed between the first body 12 and the second body 14, wherein the space 10a is adapted to receive the fixing frame 30, the at least one battery assembly 20, and the monitoring device 40. Two electrodes 16 are disposed on the case 10.

Figure 1:
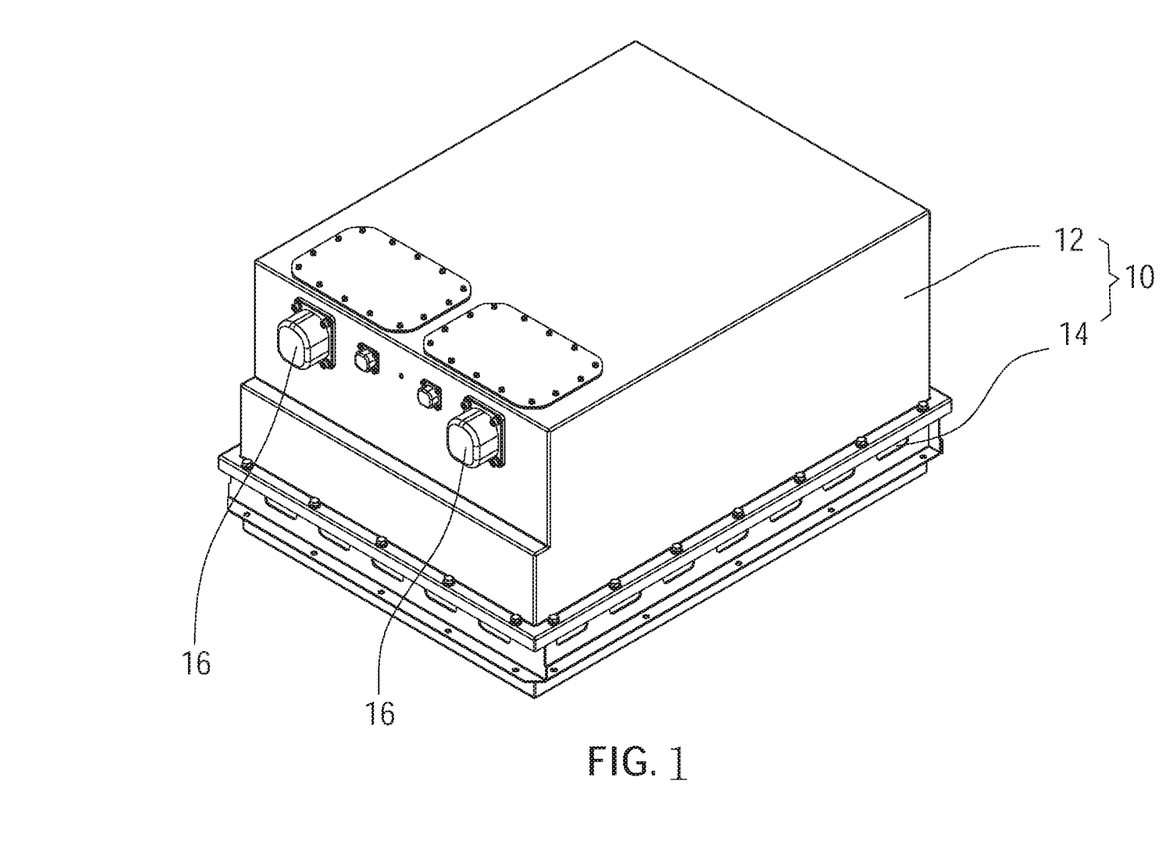
FIG. 1 is a perspective view of the battery pack of an embodiment of the present invention.
Figure 2:
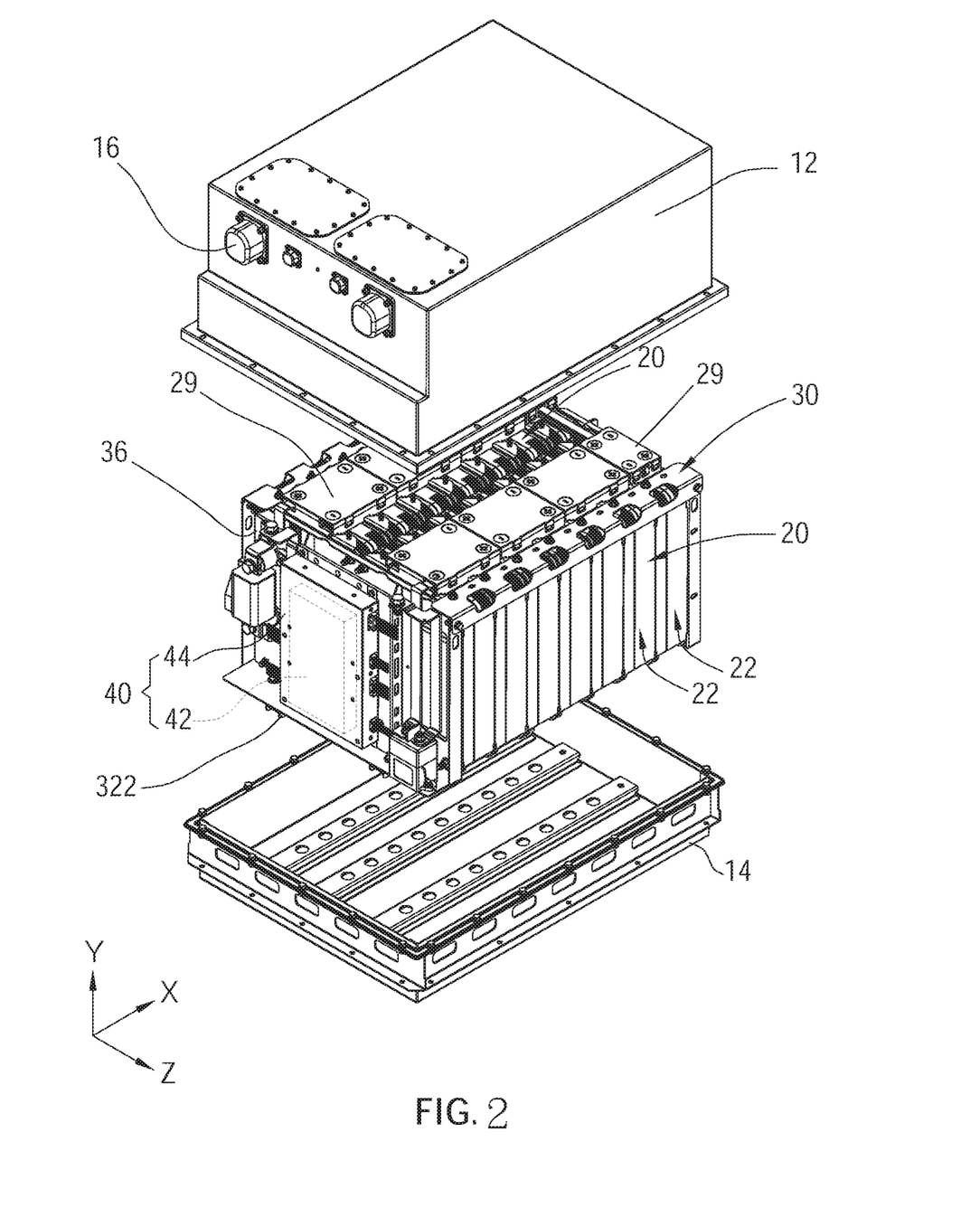
FIG. 2 is an exploded perspective view of the battery pack of the embodiment of the present invention.
Figure 3:
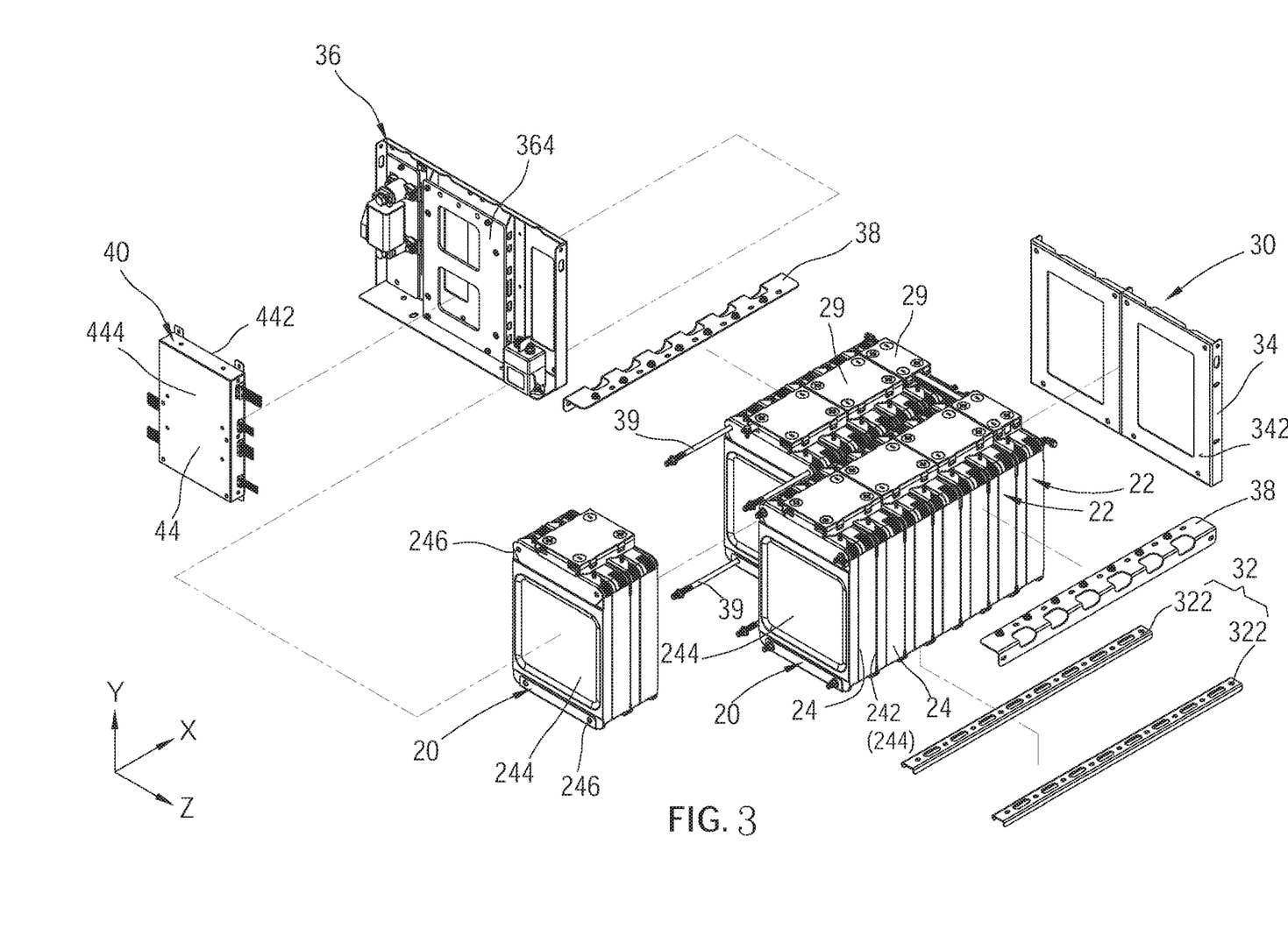
FIG. 3 is a partially exploded perspective view of the battery pack of the embodiment of the present invention.
Figure 4:
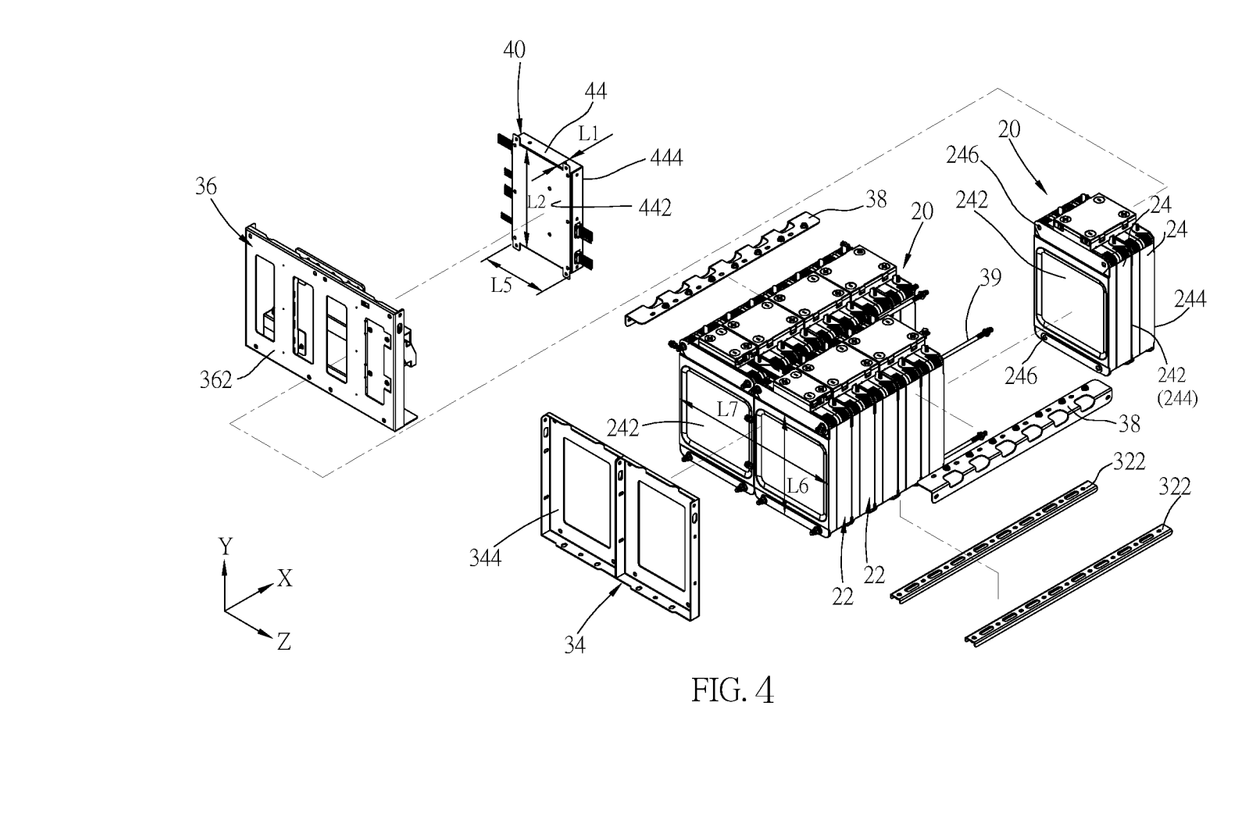
FIG. 4 is a partially exploded perspective view, showing the battery pack in FIG. 3 in another direction.
Figure 5:
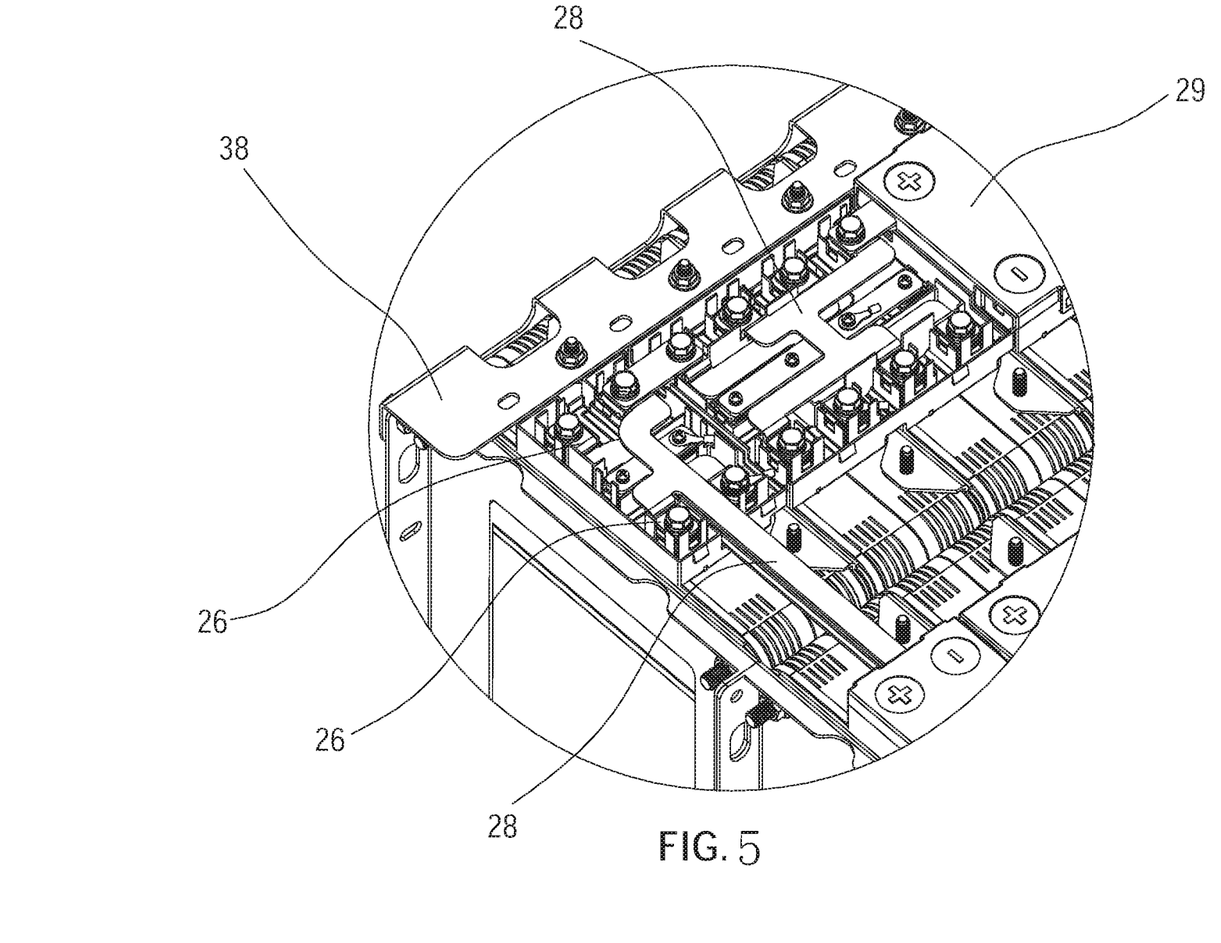
FIG. 5 is a perspective view, showing the terminal of the battery pack of the embodiment of the present invention.

In the current embodiment, the battery pack includes two battery assemblies 20 juxtaposed in the fixing frame 30, wherein each of the battery assemblies 20 includes a plurality of battery modules 22 arranged along the first axial direction X which is defined as a predetermined axial direction of the present invention. Each of the battery modules 22 has a first casing 24, wherein the first casing 24 is cuboid. A length of the first casing 24 in the first axial direction X is smaller than a length of the first casing 24 in the second axial direction Y and a length of the first casing 24 in the third axial direction Z. Each of the first casings 24 has two opposite side surfaces 242, 244 in the first axial direction X, wherein the side surfaces 242, 244 of each of the first casings 24 abut against the side surfaces 244, 242 of the first casing 24 of the adjacent battery module 22. In other words, a minor axis of the first casing 24 is parallel to the first axial direction X. Each of the first casings 24 has a plurality of connecting holes 246 disposed on corners thereof, wherein the connecting holes 246 extend along the first axial direction X. Each of the battery modules 22 has a plurality of terminals 26, as shown in FIG. 5, wherein the terminals 26 of the battery modules 22 are disposed on a plane which is parallel to the first axial direction X, and are electrically connected to one another via at least one conductive member 28. A plurality of insulating casings 29 are provided on the battery modules 22 of the battery assemblies 20, and cover the terminals 26 and the at least one conductive member 28. In this way, the terminals 26 and the at least one conductive member 28 could be prevented from being oxidized, dirtied, accidentally short-circuited, or inadvertently touched. The terminals 26 of the battery assemblies 20 are electrically connected to the electrodes 16 on the case 10.

The fixing frame 30 includes a bottom frame 32, a first lateral frame 34, a second lateral frame 36, two side bars 38, and a plurality of connecting shafts 39, wherein the bottom frame 32 includes two supporting bars 322 for supporting the battery assemblies 20, wherein the two supporting bars 322 are respectively disposed below the two battery assemblies 20. Each of the supporting bars 322 extends along the first axial direction X. In practice, if the battery pack includes only one battery assembly, only one support bar 322 is needed. The first lateral frame 34 and the second lateral frame 36 are relatively disposed on two ends of each of the supporting bars 322, and the battery modules 22 are located between the first lateral frame 34 and the second lateral frame 36. Each of the first lateral frame 34 and the second lateral frame 36 has two opposite lateral surfaces 342, 344, and 362, 364 (i.e., the lateral surface 342, 362 face each of the battery assemblies 20, while another lateral surface 344, 364 face outward. Two ends of each of the side bars 38 are respectively engaged with a side edge of the first lateral frame 34 and a side edge of the second lateral frame 36. The connecting shafts 39 extend between the first lateral frame 34 and the second lateral frame 36 along the first axial direction X, and pass through the corresponding connecting holes 246 of the battery modules 22, so that the battery modules 22 could be regularly arranged between the first lateral frame 34 and the second lateral frame 36, which facilitates alignment of the battery modules during the assembling process. In the current embodiment, the connecting shafts 39 are through bolts as an example, which not only facilitates alignment during the assembling process, but also could be in conjunction with nuts, so that two ends of the connecting shafts 39 are screwed to be fixed on the first lateral frame 34 and the second lateral frame 36, whereby to position the battery modules 22 via the connecting shafts 39, the first lateral frame 34, and the second lateral frame 36.

Figure 6:
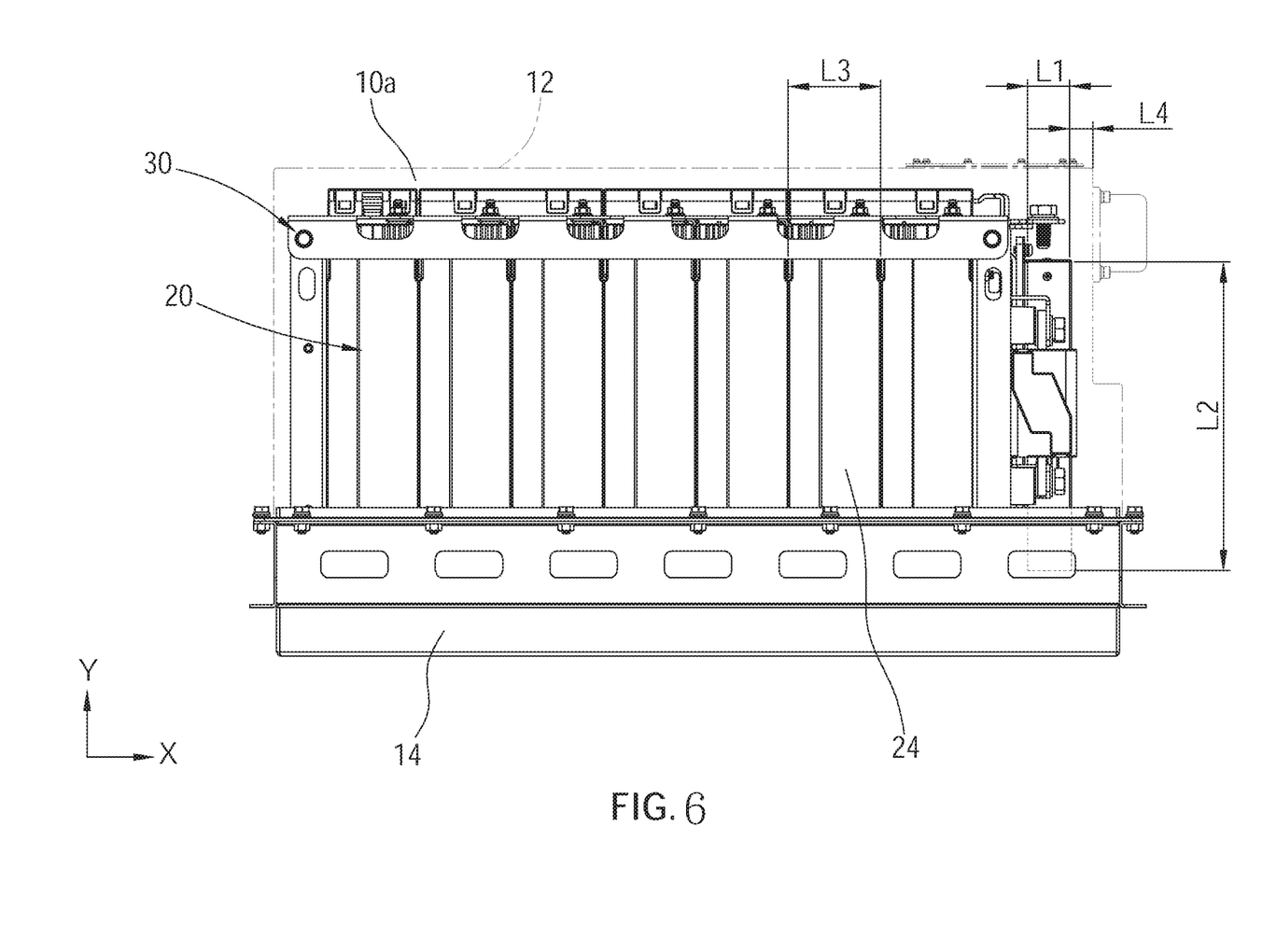
FIG. 6 is a side view of the battery pack of the embodiment of the present invention.

The monitoring device 40 is electrically connected to the battery assemblies 20 and is disposed on the fixing frame 30, and is located on a side of the battery assemblies 20 in the first axial direction X. As shown in FIG. 6, the monitoring device 40 has a first length L1 in the first axial direction X and a second length L2 in one of the axial directions which is perpendicular to the first axial direction X, wherein the first length L1 is smaller than the second length L2. In the current embodiment, the one of the axial directions which is perpendicular to the first axial direction X is the second axial direction Y as an example. In this way, a minor axis of the monitoring device 40 could be parallel to the first axial direction X, whereby the overall length of the battery pack could be reduced. In the current embodiment, the monitoring device 40 includes a monitoring circuit module 42 and a second casing 44, wherein the monitoring circuit module 42 is disposed in the second casing 44 and is electrically connected to the battery assemblies 20, whereby to monitor parameters such as voltage and temperature of the battery assemblies 20. The second casing 44 is disposed on the lateral surface 364 of the second lateral frame 36 which faces outward. The second casing 44 has an interior surface 442 and an exterior surface 444, wherein the interior surface 442 faces and is parallel to one of the lateral surfaces 244 of the adjacent battery module 22.

In the current embodiment, the second casing 44 has the first length L1 in the first axial direction X and has the second length L2 in the second axial direction Y. If the monitoring device 40 is not provided with the second casing 44, a minor axis of the monitoring circuit module 42 is parallel to the first axial direction X.

The first casing 24 of the battery modules 22 has a third length L3 in the first axial direction X, wherein the first length L1 is smaller than the third length L3. In practice, the first length L1 is smaller than or equal to the third length L3 preferably. In other words, the shorter length of the monitoring device 40 in the first axial direction X is better.

In addition, the monitoring device 40 is located within a projection area of the at least one battery assembly along the first axial direction (i.e., there are two battery assemblies in the current embodiment). In this way, the battery pack could be prevented from being overlong in the second axial direction Y and the third axial direction Z.

Moreover, a shortest distance between the exterior surface 444 of the second casing 44 and an inner wall of the case 10 which faces the exterior surface 444 in the first axial direction X is defined as a fourth length L4, wherein the fourth length L4 is smaller than the first length L1, so that a length of the case 10 could be prevented from being overlong in the first axial direction X. In practice, the case 10 could be omitted.

In conclusion, by disposing the monitoring device 40 in the first axial direction X and on a side of the at least one battery assembly, and by making the length of the monitoring device 40 in the first axial direction X be smaller than the lengths in others axial direction (i.e., the minor axis of the monitoring device 40 is located in the first axial direction X), the overall length of the battery pack could be reduced.

The second casing 44 has a fifth length L5 in the third axial direction Z. The collection of the two battery assemblies has a sixth length L6 in the second axial direction Y and a seventh length L7 in the third axial direction Z.

It must be pointed out that the embodiments described above are only some preferred embodiments of the present invention. All equivalent structures which employ the concepts disclosed in this specification and the appended claims should fall within the scope of the present invention.

What is claimed is:

1. A battery pack, comprising:
   a fixing frame;
   at least one battery assembly disposed on the fixing frame, wherein the at least one battery assembly comprises a plurality of battery modules which are arranged along a predetermined axial direction; and
   a monitoring device for monitoring the at least one battery assembly, wherein the monitoring device is electrically connected to the at least one battery assembly and is disposed on the fixing frame, and is located on a side of the at least one battery assembly in the predetermined axial direction;
   wherein the monitoring device has a second casing; the second casing has a first length in the predetermined axial direction, and a second length in a second axial direction which is perpendicular to the predetermined axial direction, wherein the first length is smaller than the second length; the second casing is a six-sided casing;
   wherein each of the battery modules has a first casing; each of the first casings has a third length in the predetermined axial direction, and the first length of the second casing is smaller than or equal to the third length of the first casing;
   wherein the fixing frame comprises two lateral frames which are each disposed in the predetermined axial direction and the battery modules are located between the two lateral frames; one of the two lateral frames has two lateral surfaces facing two opposite directions, wherein one of the two lateral surfaces faces the battery assembly, and the monitoring device is disposed on the other one of the two lateral surfaces;

wherein the battery pack comprises a case; the fixing frame, the at least one battery assembly, and the monitoring device are located in the case; the second casing faces an inner wall of the case; a shortest distance between the second casing and the inner wall of the case in the predetermined axial direction is defined as a fourth length, wherein the fourth length is smaller than the first length of the second casing;

wherein two spaces are defined on both sides of the monitoring device between a first body of the case and a lateral side of the monitoring device in a third axial direction, between the first body of the case and one of the two lateral frames of the fixing frame which is adjacent to the monitoring device in the predetermined axial direction, and between the first body and a second body of the case in the second axial direction;

the third axial direction is perpendicular to the predetermined axial direction and the second axial direction; and wherein two electrodes connected to the at least one battery assembly are disposed on the case such that geometrical projections in the predetermined axial direction of the two electrodes and the two spaces overlap.

2. The battery pack of claim 1, wherein each of the first casings has two side surfaces which are opposite to each other along the axial direction; the second casing has an interior surface which faces and is parallel to one of the side surfaces of one of the battery modules adjacent to the second casing.

3. The battery pack of claim 1, wherein the battery pack comprises two battery assemblies juxtaposed; the monitoring device is located within a projection of the two battery assemblies in the predetermined axial direction.

4. The battery pack of claim 1, wherein the fixing frame comprises a plurality of connecting shafts which are connected between the lateral frames; each of the first casings has a plurality of connecting holes; the connecting shafts pass through the corresponding connecting holes of the battery modules.

5. The battery pack of claim 1, further comprising a plurality of insulating casings, wherein the battery modules comprise a plurality of terminals; the insulating casings are disposed on the battery modules to cover the terminals.

* * * * *